United States Patent Office 2,977,213
Patented Mar. 28, 1961

2,977,213
PROCESS FOR THE PRODUCTION OF COMPLEX FERTILIZERS CONTAINING NITROGEN, PHOSPHORUS, POTASSIUM, AND MAGNESIUM

Aulo Maluta and Liborio Casale, Milan, Italy, assignors to A.P.E. Applicazione Processi Elettrochimici S.p.A., Genoa, Italy No Drawing. Filed May 16, 1958, Ser. No. 735,682

Claims priority, application Italy May 18, 1957

2 Claims. (Cl. 71—41)

It is known how potassium ores such as kainite, schoenite, langbeinite, leonite and others, containing complex salts of potassium and magnesium, are actually of a modest value for the direct use as fertilizers because of their low potassium content. It is also known how difficult it is to obtain, from the above mentioned minerals, potassium salts with a high potassium content through low cost processing. Furthermore, by now it has become largely popular in the fertilizing technique to use complex fertilizers in which the nutritive elements are associated in a particularly active form, thanks to a synergetic action of the chemical elements present therein.

It is the object of the present invention to obtain complex fertilizers having a high fertilizing value, and containing nitrogen, phosphorus, potassium, magnesium and other elements, through a simple processing cycle, utilizing as starting materials the above mentioned potassium salts either as they are found in nature, or enriched or obtained in whatever way.

By the process according to the invention, it is possible to preserve in the end product of increased potassium content those elements that are normally lost in the usual refining processes of potassium salts.

The process being the object of the present invention consists in the treatment of potassium-magnesium salts, either solid or in solution, eventually in the presence of other salts, with phosphoric acid at a random concentration, and with ammonia, either anhydrous or in solution, until partial or full neutralization of the hydrogen ions present is achieved.

The minerals thus treated may be constituted by: complex salts of potassium and magnesium, or by a mixture of potassium salts and magnesium salts, or by a mixture of said salts and others, such as for instance: sodium chloride, calcium sulphate and the like, or there may be subjected to the treatment as described above extraction products containing said salts that have undergone a partial or complete refining operation through flotation or other ore dressing processes.

Among the mineral salts suitable as starting materials for the process according to the invention, we name particularly kainite, leonite, schoenite, langbeinite, hartsalz and mixtures thereof.

Other suitable starting materials are the mother liquors containing potassium and magnesium complex salts in solution, which mother liquors are obtained as by-products from the refining of potassium salts.

The process according to the present invention may be carried out according to one of the following modes of operation:

(1) To the double salt of potassium and magnesium, or to a mixture of mineral salts containing potassium and magnesium, or to a solution of said salts, there is added phosphoric acid or a solution of the same. Subsequently, there is added gaseous or liquid ammonia, or a solution of ammonia, until the hydrogen ions present have been partially or fully combined to form salts.

(2) To the double salt or to the mixture of salts as under (1) phosphoric acid and ammonia are simultaneously added. Part of the ammonia may be introduced prior to the addition of phosphoric acid.

(3) To the double salt or to the mixture of salts as under (1) phosphoric acid containing an admixture of ammonium phosphate is added. Thereafter, ammonia is added as under (1).

Part of the ammonia may be added prior to the addition of phosphoric acid, as under (2).

(4) To the double salt, or to the mixture of salts as under (1), ammonium phosphate or a solution thereof is added, and eventually ammonia as under (1) or under (2).

(5) To the double salt, or to the mixture of salts as under (1), an ammonium phosphate solution containing an excess of ammonia is added. Part of the ammonia can be added afterwards, as under (1), or before, as under (2).

The products obtained can be dried and directly used as fertilizers wherein the phosphorous anhydride is $98/100$ percent soluble in ammonium citrate.

The percentages of utilisable elements may eventually be modified by adding other fertilizers such as ammonium salts, potassium salts, superphosphate or the like.

For every molecule of phosphoric acid added, up to three molecules of ammonia can be fixed. By the treatment according to the invention, at least part of the magnesium contained in the starting materials becomes bound in the form of magnesium ammonium phosphate.

In order to illustrate the process being the object of the invention, there are set forth hereinafter a number of examples of carrying the same out in practice. These examples are, however, not to be understood as limiting the present invention in any way or form.

Example No. 1

1000 kilograms of mineral crude kainite having a content of 17.7% $K_2O$ and containing 9.1% Mg, and 20% water, are treated with 1460 kilograms of a 25% phosphoric acid solution. To the slurry thus obtained are added 190 kilograms of ammonia. After drying there are obtained 1440 kilograms of a fertilizer containing 11% of ammoniacal nitrogen, 18.2% of phosphoric anhydride, 12.2% of potassium oxide and 10.0% of magnesium oxide.

Example No. 2

1000 kilograms of a product resulting from the processing of kainite, and containing 28.0% $K_2O$, 5.4% $NH_4$, 3.6% Mg, are treated with 584 kilograms of a 25% phosphoric acid solution and with 76 kilograms of $NH_3$.

After drying there are obtained about 1220 kilograms of a fertilizer containing 8.9% of ammoniacal nitrogen, 8.6% of phosphoric anhydride, 23.0% of potassium oxide and 4.89% of magnesium oxide.

Example No. 3

1000 kilograms of schoenite containing 22.1% $K_2O$, 6.4% Mg, and 22.6% water, are treated with 1030 kilograms of a 25% phosphoric acid solution and with 134 kilograms of $NH_3$.

After drying, there are obtained about 1240 kilograms of a fertilizer containing 8.9% of ammoniacal nitrogen, 15% of phosphoric anhydride, 17.8% of potassium oxide, and 8.5% of magnesium oxide.

The products obtained according to all of the above mentioned examples contain the phosphoric anhydride in a form soluble in ammonium citrate and may be used as fertilizers either directly or after adding other fertilizers so as to modify their useful elements contents.

What we claim is:

1. A process for producing quaternary complex fertilizers containing a high concentration of potassium as well as magnesium, nitrogen and phosphorus, comprising the steps of (1) adding to a starting material containing a mineral of a double salt of potassium and magnesium, said mineral selected from the group consisting of kainite, leonite, schoenite, langbeinite, hartsalz, and mixtures thereof, a solution of 25% phosphoric acid in an amount approximately equimolar to the magnesium content of the starting material, independently of the potassium content of the latter, and ammonia in an amount of approximately 3 moles $NH_3$ for every mole of $H_3PO_4$, thereby binding at least part of the magnesium contained in the starting material as a phosphatic magnesium salt, and (2) drying the resulting product to obtain a fertilizer containing nitrogen, magnesium and potassium, and having a $P_2O_5$ content which is 98–100% soluble in ammonium citrate.

2. A process as described in claim 1, characterized in that the magnesium content of every 1000 kilograms of said starting material ranges from about 36 to about 91 kilograms of Mg, wherefor the amount of 25% phosphoric acid solution added ranges from about 584 kilograms to about 1400 kilograms, and the amount of ammonia added ranges from about 76 kilograms to about 190 kilograms.

References Cited in the file of this patent

UNITED STATES PATENTS

| | | |
|---|---|---|
| 2,439,432 | Keenen et al. | Apr. 13, 1948 |
| 2,618,547 | Davenport et al. | Nov. 18, 1952 |
| 2,680,680 | Coleman | June 8, 1954 |
| 2,716,591 | Thomsen | Aug. 30, 1955 |
| 2,783,140 | Hignett et al. | Feb. 26, 1957 |